United States Patent [19]

Chern et al.

[11] Patent Number: 5,370,468
[45] Date of Patent: Dec. 6, 1994

[54] DUST COVER ASSEMBLY FOR COMPUTER KEYBOARD

[76] Inventors: Tony Chern, No.53, Lane 345, Min Chu Rd., Chang Hua City, Taiwan, Prov. of China; Sheng H. Cheng, No. 37, Chung Cheng St., She Kou Tsun Fen Yuan Hsiang, Chang Hua Hsien, Taiwan, Prov. of China

[21] Appl. No.: 215,935

[22] Filed: Mar. 22, 1994

[51] Int. Cl.⁵ .............................................. B41J 29/12
[52] U.S. Cl. ................................... 400/713; 400/714; 312/208.3; 312/208.4
[58] Field of Search ............... 400/713, 714, 715, 496, 400/467; 150/165; 312/208.1, 208.3, 208.4

[56] References Cited

U.S. PATENT DOCUMENTS

| | | | |
|---|---|---|---|
| 2,008,412 | 7/1935 | Bovee et al. | 312/208.3 |
| 3,454,075 | 7/1969 | Weinstein | 312/208.3 |
| 4,922,980 | 5/1990 | Parker | 150/165 |

*Primary Examiner*—Edgar S. Burr
*Assistant Examiner*—Lynn D. Hendrickson
*Attorney, Agent, or Firm*—Testa, Hurwitz & Thibeault

[57] ABSTRACT

A dust cover assembly for a computer keyboard includes a shell body which is attached to a longitudinal side of the keyboard. A slit is longitudinally formed on a peripheral upperside of the shell body. A hollow spindle is rotatably mounted in the shell body. A plug is fitted in a first end of the spindle. A flexible screen has a first end attached to the spindle and has a distal end with an elongated slat mounted thereon. A first cap member is attached to a first end of the shell body. A rod has a first end securely fitted in the first cap member and has a second end mounted in the spindle through the plug. A torsional spring is rotatably mounted around the rod and has a first end securely attached to the plug to rotate therewith and a second end fixed to the second end of the rod. A second hollow cap member is attached to a second end of the shell body and has a slot formed in an upper side thereof. A ratchet gear is received in the second cap member and is engaged with a second end of the spindle to rotate therewith. A switch device is slidably engaged on the second cap member and has a catch which is releasably engaged with the ratchet gear and is restricted to slide along the slot between a first position where the catch is in contact with the ratchet gear, whereby the ratchet gear is limited to rotate in one direction only, and a second position where the ratchet gear is disengaged from the catch, whereby the ratchet gear is capable of rotating in both directions freely.

4 Claims, 4 Drawing Sheets

DUST COVER ASSEMBLY FOR COMPUTER KEYBOARD

BACKGROUND OF THE INVENTION

1. Field of Invention

The present invention relates to a dust cover assembly, and more particularly to a dust cover assembly for a computer keyboard.

2. Related Prior Art

A conventional dust cover for a computer keyboard which is made of transparent solid plastic material is easy to be stepped on by someone passing by when the dust cover is disposed on the floor by an absent-minded user so that the dust cover is easily destroyed. Moreover, it is necessary to put the dust cover on some other place when not in use, such that the dust cover occupies an additional space and is easy to be taken away or lost. Furthermore, the conventional dust cover is always exposed to outer surroundings such that the dust is easy to be accumulated on the surface thereon so as to create a secondary pollution on the computer keyboard.

The present invention has arisen to mitigate and/or obviate the afore-mentioned disadvantages of the conventional dust cover assembly for a computer keyboard.

SUMMARY OF THE INVENTION

The primary objective of the present invention is to provide a dust cover assembly for a computer keyboard.

Another objective is to provide a dust cover assembly which is not easy to be taken away or lost.

A further objective is to provide a dust cover assembly which does not occupy additional space.

Another objective is to provide a dust cover assembly which is not easy to be contaminated by foreign material or dust and is not easy to be destroyed by someone.

In accordance with one aspect of the present invention, there is provided a dust cover assembly for a computer keyboard including a shell body which has a first end and a second end and is securely attached to a longitudinal side of the keyboard. A slit is longitudinally formed on a peripheral upperside of the shell body. A hollow spindle has a first end and a second end, and is rotatably mounted in the shell body. A plug is fitted in the first end of the spindle. A flexible screen has a first end attached to the spindle and has a distal end with an elongated slat mounted thereon. A first cap member is attached to the first end of the shell body. A rod has a first end securely fitted in the first cap member and has a second end mounted in the spindle through the plug. A torsional spring is rotatably mounted around the rod and has a first end securely attached to the plug to rotate therewith and a second end fixed to the second end of the rod. A second hollow cap member is attached to the second end of the shell body and has a slot formed in an upper side thereof. A ratchet gear is received in the second cap member and is engaged with the second end of the spindle to rotate therewith. A switch device is slidably engaged on the second cap member and has a catch which is releasably engaged with the ratchet gear and is restricted to slide along the slot between a first position where the catch is in contact with the ratchet gear, whereby the ratchet gear is limited to rotate in one direction only, and a second position where the ratchet gear is disengaged from the catch, whereby the ratchet gear is capable of rotating in both directions freely.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 2 is an enlarged cross-sectional view as shown in. FIG. 1, illustrating how a switch means engages with a ratchet gear;

DETAILED DESCRIPTION OF THE PREFERRED EMBODIMENTS

Figure 1:
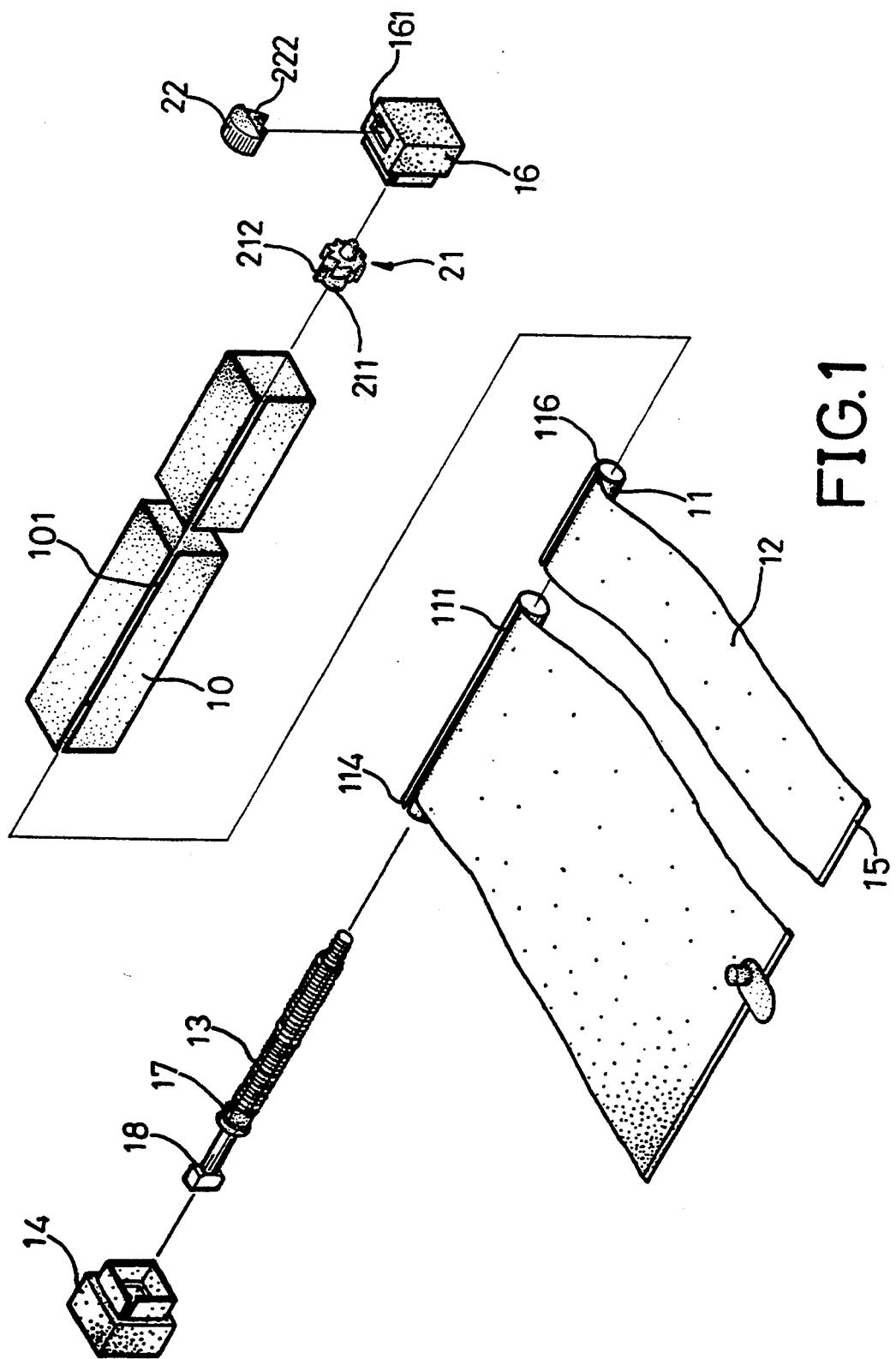
FIG. 1 is an exploded view of a dust cover assembly for a computer keyboard in accordance with a first embodiment of the present invention.

Referring to the drawings, and particularly to FIG. 1, a dust cover assembly for a computer keyboard 60 in accordance with a first embodiment of the present invention includes a shell body 10 which has a first end and a second end and is integrally formed to a longitudinal side of the keyboard 60. A slit 101 is longitudinally formed on a peripheral upperside of the shell body 10.

A hollow spindle 11 has a first end 114 and a second end 116, and is rotatably mounted in the shell body 10. A flexible screen 12 which is made of a fabric or a plastic material has a first end securely attached to the spindle 11 and has a distal end with an elongated slat 15 mounted thereon. The spindle 11 has two elongated edges between which a slit 111 is thereby defined. The first end of the flexible screen 12 is inserted in the slit 111 and is clamped by the elongated edges, thereby attaching the flexible screen 12 to the spindle 11. Initially, the flexible screen 12 is scrolled about the hollow spindle 11, so that the spindle 11 is rotated when the flexible screen 12 is unscrolled therefrom.

In assembly, a plug 17 is fitted in the first end 114 of the spindle 11 while a rib longitudinally protruding on a peripheral portion of plug 17 is received in the slit 111 of the spindle 11, thereby restraining the plug 17 to rotate synchronously with the spindle 11. A first cap member 14 is attached to the first end of the shell body 10 and has a bore of a rectangular cross-section formed therein. A rod 18 has a first end of a rectangular cross-section fitted in the bore of the first cap member 14, thereby maintaining the rod 18 in a steady position relative to the first cap member, 14, and has a second end mounted in the spindle 11 through the plug 17.

A torsional spring 13 is rotatably mounted around the rod 18 and has a first end securely attached to the plug 17, thereby restraining the torsional spring 13 to rotate synchronously with the plug 17, and has a second end fixed to the second end of the rod 18. When the spindle 11 is rotated relative to the rod 18 through the plug 17, the torsional spring 13 is loaded with restitution torque which will rotate the spindle 11 backwards when the spindle 11 is released. A second hollow cap member 16 is attached to the second end of the shell body 10 and has a slot 161 defined in an upper side thereof. A ratchet gear 21 having an extension 211 is received in the second cap member 16 and is engaged with the second end 116 of the spindle 11 while a rib 212 longitudinally protruding on a peripheral portion of the extension 211 is received in the slit 111 of the spindle 11, thereby restraining the ratchet gear 21 to rotate synchronously with the spindle 11.

Figure 2:
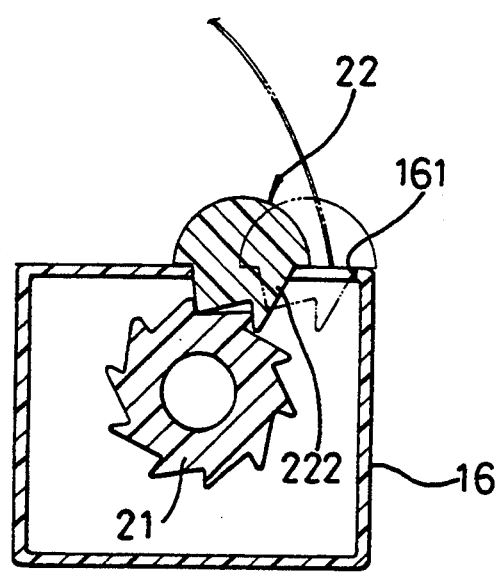

Particularly referring to FIG. 2, a switch means 22 is slidably engaged on the second cap member 16 and has a catch 222 which is releasably engaged with the ratchet gear 21. The catch 222 is restricted to slide along the slot 161 between a first position (as shown in solid line) where the catch 222 is in contact with the ratchet gear 21, whereby the ratchet gear 21 is limited to rotate in one direction only, and a second position (as shown in phantom line) where the ratchet gear 21 is disengaged from the catch 222, whereby the ratchet gear 21 is capable of rotating in both directions freely.

In operation, when the flexible screen 12 is unscrolled from the spindle 11, the catch 222 of the switch means 22 is in the first position such that the ratchet gear 21 and thus the spindle 11 are limited to be rotated in one direction only and are not able to rotate backwardly so as to prevent the flexible screen 12 from being scrolled backwardly. In the process of rotation, the torsional spring 13 is loaded with restitution torque such that when the catch 222 of the switch means 22 is in a second position, thereby causing the ratchet gear 21 and thus the spindle 11 to rotate freely, the torsional spring 13 is capable of driving the spindle 11 to rotate backwardly so as to scroll the flexible screen 12.

Figure 4:
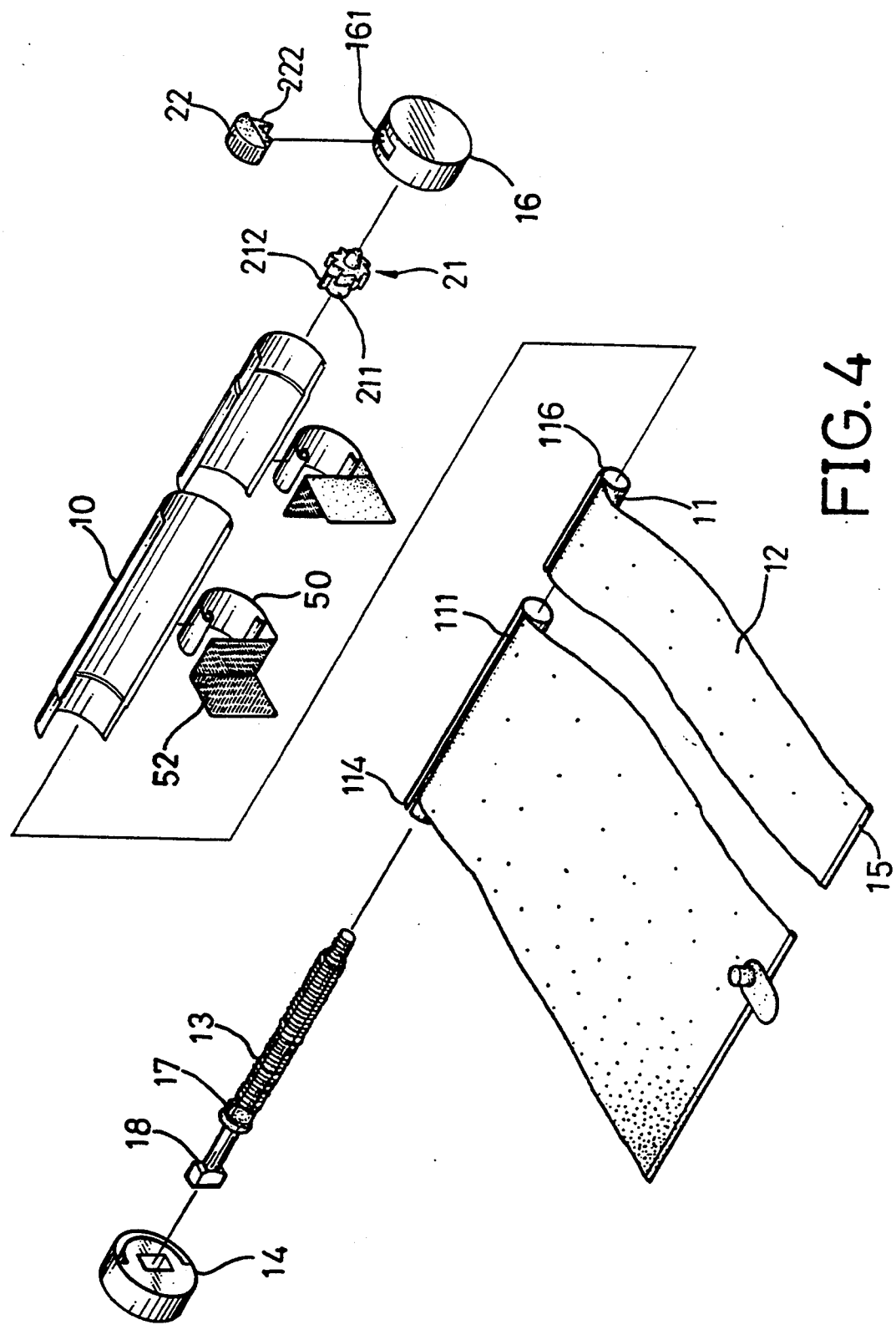
FIG. 4 is an exploded view of a dust cover assembly for a computer keyboard in accordance with a second embodiment of the present invention.

Referring to FIG. 4, in accordance with a second embodiment of the present invention, the shell body 10 is semi-cylindrical in section. The first and second cap members 14 and 16 are circular-shaped. A pair of hook elements 50 are respectively attached to the first and second ends of the semi-cylindrical shell body. A pair of L-shaped adhesive elements 52 respectively extend laterally from said hook elements 50 and respectively adhere to the first and second ends of the keyboard 60 such that the cylindrical shell body 10 is securely attached to a longitudinal side of the keyboard 60.

Figure 3:
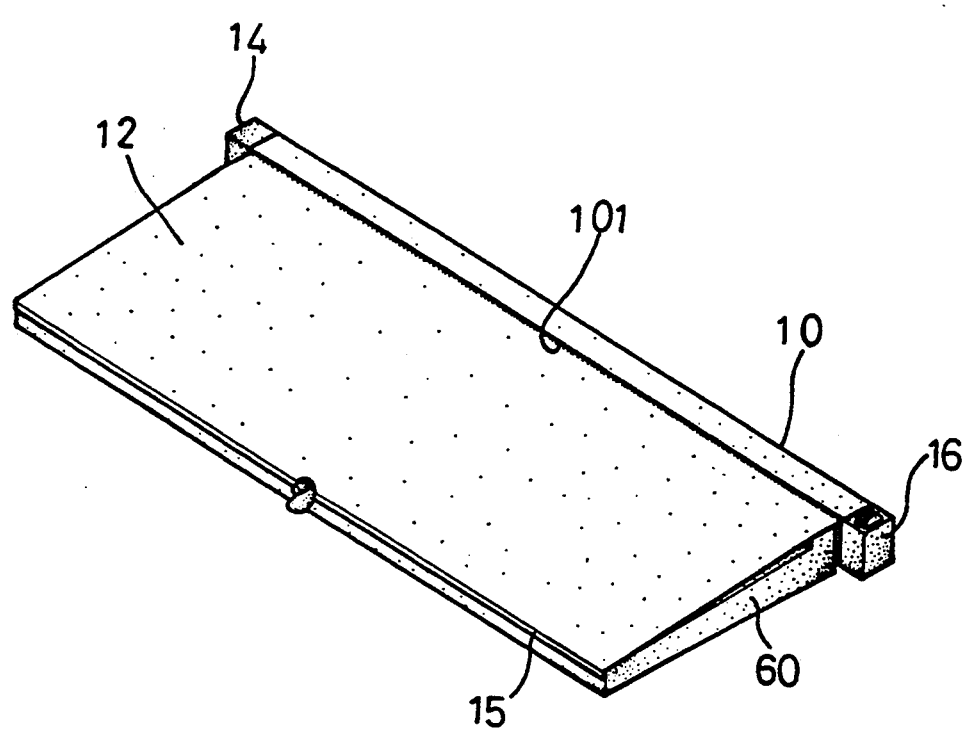
FIG. 3 is an assembly view of the dust cover assembly with the computer keyboard.

Accordingly, by such an arrangement, the dust cover assembly for a computer keyboard in accordance with the present invention has the following advantages and benefits:

(1) The shell body 10 is securely attached to the computer keyboard 60 (as shown in FIG. 3) so that the dust cover assembly is not easy to be taken away or lost.

(2) The shade body 12 is easy to be scrolled about or unscrolled from the spindle 11 such that the dust cover assembly does not occupy additional space.

(3) The shade body 12 is scrolled about the spindle 11 when not in use so as to prevent the shade body 12 from being contaminated by foreign material or dust and from being destroyed by someone.

It should be clear to those skilled in the art that further embodiments of the present invention may be made without departing from the teachings of the present invention.

We claim:

1. A dust cover assembly for a computer keyboard having opposite first and second longitudinal sides, said dust cover assembly comprising:
   a shell body attached to said first side of said keyboard and having a first end and a second end, a slit being longitudinally formed on a peripheral upperside of said shell body;
   a hollow spindle rotatably mounted in said shell body and having a first end and a second end;
   a flexible screen having a first end securely attached to said spindle and a distal end with an elongated slat mounted thereon;
   a first cap member attached to the first end of said shell body;
   a plug fitted in said first end of said spindle;
   a rod having a first end securely fitted in said first cap member and having a second end mounted in said spindle through said plug;
   a torsional spring rotatably mounted around said rod, and having a first end securely attached to said plug to rotate therewith and a second end fixed to said second end of said rod;
   a second hollow cap member attached to the second end of said shell body and having a slot formed in an upper side thereof;
   a ratchet gear received in said second cap member and engaged with said second end of said spindle to rotate therewith; and
   a switch means slidably engaged on said second cap member and having a catch which is releasably engaged with said ratchet gear and is restricted to slide along said slot between a first position where said catch is in contact with said ratchet gear, whereby said ratchet gear is limited to rotate in one direction only, and a second position where said ratchet gear is disengaged from said catch, whereby said ratchet gear is capable of rotating in both directions freely.

2. The dust cover assembly in accordance with claim 1, wherein said shell body is integrally formed to said first side of said keyboard.

3. The dust cover assembly in accordance with claim 1, wherein said shell body is semi-cylindrical in section, a pair of hook elements are respectively attached to the first and second ends of said semi-cylindrical shell body, a pair of L-shaped adhesive elements respectively extend from said hook elements for adhering the first and second ends of said semi-cylindrical shell body to the first and second ends of said keyboard.

4. The dust cover assembly in accordance with claim 3, wherein said first and second cap members are circular-shaped.

* * * * *